United States Patent
Park et al.

(10) Patent No.: US 8,703,299 B2
(45) Date of Patent: Apr. 22, 2014

(54) CLICK PLYWOOD FLOORING

(75) Inventors: Sung-Ha Park, Chungcheongbuk-do (KR); Jae-Wan Sung, Chungcheongbuk-do (KR)

(73) Assignee: LG Hausys, Ltd., Seoul (KR)

( * ) Notice: Subject to any disclaimer, the term of this patent is extended or adjusted under 35 U.S.C. 154(b) by 72 days.

(21) Appl. No.: 13/061,672

(22) PCT Filed: Mar. 9, 2009

(86) PCT No.: PCT/KR2009/001149
§ 371 (c)(1),
(2), (4) Date: Mar. 1, 2011

(87) PCT Pub. No.: WO2010/027133
PCT Pub. Date: Mar. 11, 2010

(65) Prior Publication Data
US 2011/0162308 A1 Jul. 7, 2011

(30) Foreign Application Priority Data
Sep. 3, 2008 (KR) ........................ 10-2008-0086600

(51) Int. Cl.
*B32B 21/08* (2006.01)

(52) U.S. Cl.
USPC ..... 428/528; 428/514; 428/537.1; 428/425.1; 428/167; 52/589.1

(58) Field of Classification Search
USPC .............. 428/167, 172, 425.1, 514, 526, 528, 428/529, 537.1; 52/578, 590.2, 591.1, 52/591.3, 592.1, 592.2, 589.1
See application file for complete search history.

(56) References Cited

U.S. PATENT DOCUMENTS

| 2,565,251 | A | * | 8/1951 | Malmstrom | 428/106 |
| 3,046,171 | A | * | 7/1962 | Rogers | 428/311.11 |
| 3,152,029 | A | * | 10/1964 | Orloff | 156/91 |
| 3,563,844 | A | * | 2/1971 | Brown | 428/292.4 |
| 6,182,413 | B1 | * | 2/2001 | Magnusson | 52/589.1 |
| 7,838,578 | B2 | * | 11/2010 | Ryu | 524/15 |
| 8,245,477 | B2 | * | 8/2012 | Pervan | 52/592.1 |
| 2005/0079323 | A1 | * | 4/2005 | Miller et al. | 428/141 |
| 2007/0022695 | A1 | * | 2/2007 | Magnusson | 52/592.1 |

FOREIGN PATENT DOCUMENTS

| CN | 2228108 Y | | 5/1996 | | |
| CN | 2399345 Y | | 10/2000 | | |
| JP | 2900465 | | 9/1991 | | |
| JP | 07233619 A | * | 9/1995 | ............. | E04F 15/04 |
| JP | 10-101967 | | 4/1998 | | |
| JP | 10-159320 A | | 6/1998 | | |
| JP | 11114911 A | * | 4/1999 | ............. | B27D 5/00 |
| JP | 2000271907 A | * | 10/2000 | ............. | B27M 3/00 |
| JP | 2002-194885 | | 7/2002 | | |
| JP | 2003-336388 A | | 11/2003 | | |
| JP | 2008-057154 A | | 3/2008 | | |
| KR | 20-0324825 | | 8/2003 | | |

(Continued)

*Primary Examiner* — Adriana Figueroa
(74) *Attorney, Agent, or Firm* — McKenna Long & Aldridge, LLP

(57) ABSTRACT

A plywood flooring including a plywood as a substrate, where the plywood is heat-compressive treated in a density of 0.6 to 1.0 g/cm³ and is impregnated with a synthetic resin having a viscosity of 100 to 20,000 cp, which has both of the advantages of reinforced floorboards and the advantages of plywood floorboards.

7 Claims, 1 Drawing Sheet

(56) References Cited

FOREIGN PATENT DOCUMENTS

| KR | 359803 | 8/2004 |
|---|---|---|
| KR | 430315 | 8/2004 |
| KR | 10-2005-0048857 A | 5/2005 |
| KR | 399316 | 10/2005 |
| KR | 10-2006-0062090 A | 6/2006 |
| KR | 10-0674210 | 1/2007 |
| KR | 10-0696119 | 3/2007 |
| WO | WO 97/47834 | 12/1997 |
| WO | WO 2007069807 A1 * | 6/2007 |

* cited by examiner

CLICK PLYWOOD FLOORING

CROSS-REFERENCE TO RELATED APPLICATIONS

This application is a National Stage Entry of International Application No. PCT/KR2009/001149, filed Mar. 9, 2009, and claims the benefit of Korean Application No. 10-2008-0086600, filed on Sep. 3, 2008, which is hereby incorporated by reference for all purposes as if fully set forth herein.

BACKGROUND OF THE INVENTION

1. Technical Field

The present invention relates to plywood flooring, and more specifically to plywood flooring, of which the plywood is heat-compressive treated and click-shaped in order to provide flooring materials having both of the advantages of reinforced floorboards and the advantages of plywood floorboards.

2. Background Art

For a dimensional stability of flooring material, plywood flooring is relatively better than reinforced floorboard, and for a construction velocity, the reinforced floorboard is excellent.

The detailed reasons are that the plywood is excellent for the dimensional stability, and a click fastening method (reinforced floorboard) makes the construction velocity to be done more quickly as compared to the use of rubber hammer (plywood flooring).

Japanese Patent Publication No. 2002-194885 discloses that plywood flooring material, in which various wood layers are laminated and each wood layer is adhered at the same time, includes a body part, a real part that is projecting out on at least one side of the body part, a bottom of groove part for inserting a real part of other plywood flooring material to the other side of the body part, and a groove part for reinforcement type on opposite side that is formed on the end between the side of the body part and the real part toward the body part. However, the real part and the groove part have T&G (Tongue and Groove) bonding structure.

Korean Patent Registration No. 674210 discloses a flooring board material for floor finishing composed of an end inserting part having an end downward projection that is projected downward on the bottom side and is projected to the outside on the end side, an end receiving part having an end downward groove that is formed inside from the center part of other end side and is embayed downward on the bottom side and makes a pair with an end inserting part, and a hot melt adhesive that is adhered on the other side, in which the flooring board material further includes a side inserting part having a lateral projection that is formed on one side end and a side downward projection that is projecting to the downward on the bottom side to be not continuous with the lateral projection, a side receiving part that is formed to the downward in a circular type on the inside of the side receiving groove that is formed on the other side end and has a side downward groove that is extended on the one point to the upward, and an end upward projection that is extended to the outside from the end downward groove and then projected to the upward, and also has about 30° of a fixed guided angle on the one side.

Korean Utility Model Registration No. 359803 discloses an adjustable flooring material, in which a projecting part is formed in a fixed length on two sides of one side, an inserting groove having a fixed depth is matched up with the projecting part on the other two sides, a groove has a role in passing air and is formed on the down center to prevent itself modification, an elastic material having a fixed thickness is adhered to the bottom of woodblock to buffer an impact and load applied from the up part of woodblock, a space part having a fixed size is formed on the bottom of the elastic material so that the inserting groove part of the woodblock is smaller than the woodblock, the projecting part of woodblock supports the bonding region of the projecting part and the inserting groove when bonding a plurality of woodblocks, the plywood material is adhered to be larger than the woodblock so that the bonding region is formed to be bound with the elastic material of the other flooring material that is assembled with the above flooring material, a plurality of fixed nails are inserted for bonding the wood material, the elastic material, and the plywood material on the bottom of the plywood material, and the projecting part and the inserting groove has T&G bonding structure.

Korean Utility Model Registration No. 399316 discloses a floor that is laminated with a natural marked type wood on the upper side of a composite panel of plastic fiber and wood fiber as a substrate. In the case of the above model, the key purpose is to provide the floor having a strength surface property that is a disadvantage of the plywood flooring, in which the floor can freely modify the appearance effect and the texture of the surface design, and the dimensional stability of the floor is the same level with the plywood flooring.

When the click structure is provided to the flooring material, it is easy to install the flooring material into the floor. Therefore, many researches are being performed to provide the click structure to a substrate, such as a wood, plywood, high density fiber board (HDF), and the like at home and aboard for a long time.

The click is easily provided to a substrate, such as HDF and a wood, but cannot be easily provided to the plywood. The reasons are that a density of the plywood (0.4~0.6 g/cm$^3$) is relatively lower than that of HDF (0.8 g/cm$^3$) and a wood so that when providing the click to the plywood, the click shape will be broken or the processing surface of the click will be not smooth. For this reason, there are no the commercialized products, in which the click are given to the plywood within the country.

In addition, the existed plywood flooring may generate formaldehyde after constructing so that the problem about an indoor air quality exists. The reason is that a synthetic resin used for preparing plywood and an adhesive agent used for constructing the plywood flooring mainly causes the above problem.

BRIEF SUMMARY OF THE INVENTION

Technical Problem

According to the present invention, plywood is impregnated with synthetic resins and heat-compressive treated when preparing plywood in order to solve the above problems. Specifically, according to the present invention, after a dimensional stability of plywood can be improved through the resin impregnation method and a density of plywood can be improved through the heat-compressive treatment, plywood is finally click-shaped so that plywood flooring can be developed, in which the plywood flooring has click-shape, an excellent dimensional stability like reinforced floorboards, and additionally is high-density plywood materials so that it has improved surface properties as compared with a general plywood.

Therefore, an object of the present invention provides flooring materials having all of three advantages of reinforced floorboards and plywood floorboards, i.e., an excellent dimensional stability, a strong surface property, and a quick workability.

Additionally, another object of the present invention provides plywood flooring, in which the plywood flooring can solve the problem about an indoor air quality by constructing flooring material in a non-adhesive way that does not requires an adhesive agent for constructing and also uses an environmental-friendly synthetic resin.

Technical Solution

In order to achieve the above purposes, the plywood flooring according to an embodiment of the present invention uses plywood that is heat-compressive treated as a material.

The plywood flooring according to another embodiment of the present invention uses plywood that is impregnated with a synthetic resin as a material.

The plywood flooring according to another embodiment of the present invention uses plywood that is heat-compressive treated and impregnated with a synthetic resin as a material.

According to the present invention, the resin impregnation of plywood improves the dimensional stability and the heat-compressive treatment of plywood improves the surface property as well as the dimensional stability.

The present invention at least uses the materials that are impregnated or heat-compressive treated, and preferably uses the materials that are impregnated and heat-compressive treated.

The plywood used for the present invention has the advantages as follows: firstly, has improved surface properties, such as a dent resistance, a scratch resistance, a quality of print processing, and the like because the density of plywood is increased through the heat-compressive treatment; secondly, since the plywood is prepared using binder (synthetic resin) impregnation/adhesion method, the dimensional stability is excellent as compared the existed single board surface coating/adhesion method; and thirdly, since the density is high, it can be possible to be click-shaped like HDF so that it has a construction effect as reinforced floorboard.

According to the present invention, the thickness of the plywood that is heat-compressive treated has declined by 0.1 to 50%, preferably 1 to 20%, and more preferably about 10% as compared to the plywood that is not heat-compressive treated. In addition, the plywood that is heat-compressive treated according to the present invention has a density from 0.6 to 2.0 $g/g/cm^3$, preferably 0.6 to 1.0 $g/g/cm^3$, and more preferably 0.7 $g/g/cm^3$.

The synthetic resin according to the present invention is a viscous synthetic resin having a viscosity of 100 to 20,000 cp for a smooth impregnation.

The present invention may use the synthetic resin as follows: phenol resin, acryl resin, melamine resin, urethane resin, urea resin, melamine-urea copolycondensation resin, melamine-phenol copolycondensation resin, vinyl acetate resin, and the like.

The plywood flooring according to the present invention may adhesive plywood flooring or non-adhesive plywood flooring.

In the case of adhesive plywood flooring, the plywood is adhered to a floor with an adhesive, and at least uses the plywood that is impregnated. An adhesive for construction shows a binding capacity so that it may select T&G (Tongue and Groove) bonding structure. In addition, click-bonding structure (bonging using click structure) can be used. At this time, the click needs a simple fastening function so that the click structure may be possible to be a simple structure.

Meanwhile, in the case of adhesive plywood flooring, when selecting a simple fastening structure, such as T&G or T&G having low level of difficulty, the heat-compressive treatment of plywood can be omitted, but when selecting the click of reinforced floorboard, a normal heat-compressive treatment should be performed.

In the case of non-adhesive plywood flooring, the plywood is not adhered to a floor, uses at least plywood that is heat-compressive treated, and constructed by the click-bonding structure that is formed on the side of plywood that is heat-compressive treated. In the case of non-adhesive plywood flooring, there is no an adhesive for construction thereby T&G bonding structure cannot be selected so that the click structure should be selected. In addition, the click should show a strong binding capacity itself so that the click structure may be complicated. The heat-compressive treatment of plywood must precede In order to form the click structure. In addition, the non-adhesive plywood flooring having the excellent dimensional stability and surface property, as well as the click-shape like reinforced floorboard can be provided through giving the click shape to the plywood having high density that is obtained from the heat-compressive treating of plywood.

The plywood flooring according to the present invention may be composed of a surface protective layer, a surface layer and plywood from above. At this time, the surface layer may be composed of a marked-type wood, a printing layer and a printing film.

A groove may be formed on the backside of plywood according to the present invention, and the dimensional change of plywood flooring is decreased and the adhesive property with a floor is excellent by the groove.

According to the present invention, a bottom of plywood may be laminated with Foam, and especially, the product integrated with plywood, in which Foam is adhered to the bottom of plywood, can be provided. Smoothness can be provided and an impact noise between plywood flooring product and a floor can be prevented through the lamination of Foam on the bottom of plywood.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, the embodiments of the present invention will be described in detail with reference to accompanying drawings.

Figure 1:
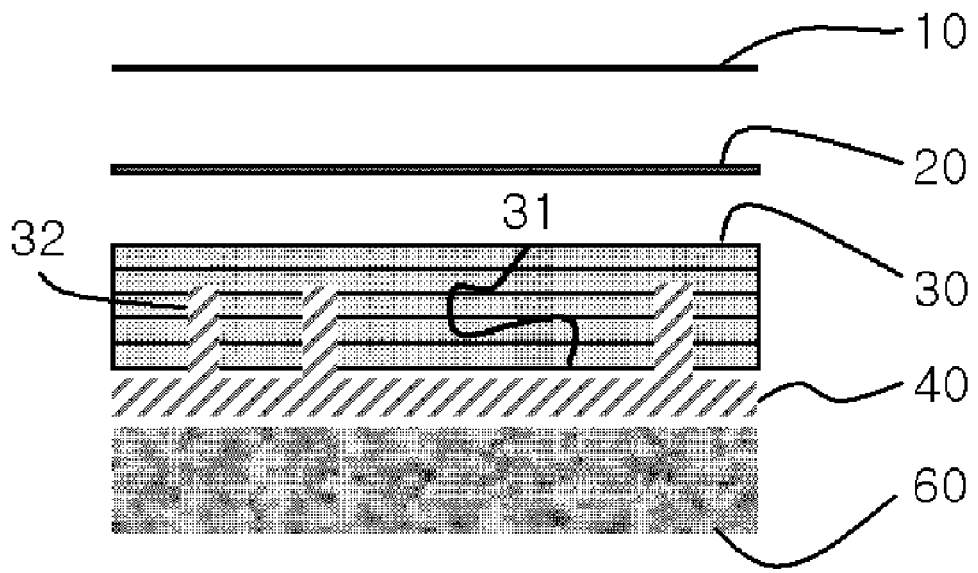
FIG. 1 is a cross-sectional diagram of click structure plywood flooring using adhesive according to the present invention.

FIG. 1 is a cross-sectional diagram of adhesive click plywood flooring according to the present invention; the plywood flooring is composed of a surface protective layer 10, a surface layer 20, and plywood 30 from above; the plywood 30 is bonded through a click-bonding structure 31 to each other; and the plywood 30 and a floor 60 are adhesively constructed with an adhesive 40.

In the case of using an adhesive for construction on the adhesive plywood flooring having the structure of FIG. 1, it may select the simple fastening structure, such as T&G or T&G level having low level of difficulty. At this time, the heat-compressive treatment of plywood can be omitted. In addition, the plywood at this time uses at least one that is impregnated with resin.

Figure 2:
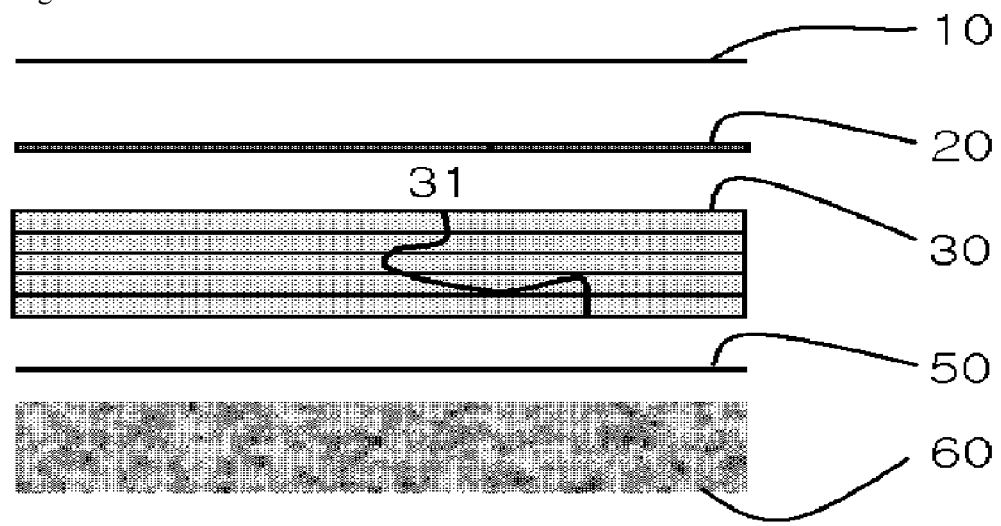
FIG. 2 is a cross-sectional diagram of click structure plywood flooring using no adhesive according to the present invention.

FIG. 2 is a cross-sectional diagram of non-adhesive click plywood flooring according to the present invention; the plywood flooring is composed of a surface protective layer 10, a surface layer 20, plywood 30 and Foam 50 from above; and the plywood 30 is bonded through a click-bonding structure 31.

In the case of non-adhesive plywood flooring having the structure disclosed in FIG. 2, it has excellent dimensional stability and surface property by having the click-shape like reinforced floorboard by giving the click-shape to the plywood having high density that is obtained from the heat-compressive treatment of plywood. At this time, the plywood that is heat-compressive treated is at least used. The click structure of FIG. 2 uses the plywood that is essentially heat-compressive treatment, so that it can be formed in more complicated structure as compared to the click structure of FIG. 1.

The existed plywood flooring materials has low density for processing the click so that the click-shape may be broken or the processing surface may be coarsened. However, the plywood material that is heat-compressive treated according to the present invention is click-shaped so that the problems of the existed structure will be solved and the need of an adhesive for constructing will be eliminated.

The surface protective layer 10 is the layer for protecting the surface, and for example may be formed by curing after coating of UV curing coating.

The surface layer 20 is the layer for implementing the appearance effect, and for example, the marked type wood, the printing layer, the printing film, and the like can be used. The range from the general marked type wood having a thickness of 0.5 mm to the hardwood marked type wood having a thickness of 3 mm can be used as the marked type wood. In addition, a transfer printing layer, and the like can be used as the printing layer, and polyethyleneterephthalate (PET), polyvinyl chloride (PVC) film, and the like can be used as the printing film.

The plywood is the material layer for providing the surface property and the dimensional stability, and the plywood that is impregnated with the synthetic resin and/or the plywood that is heat-compressive treated can be used.

A general method for producing plywood can be divided as follows: Preparing a single board→Drying a single board, repair work→Applying an adhesive for a single board→Laminating a single board/heat-compression→Completion.

A method for producing plywood according to the present invention is composed as follows: Preparing a single board→Impregnation a single board with a synthetic resin→Drying a single board, repair work→Laminating a single board/heat-compressive treatment→Completion.

An advantage of the method for producing plywood according to the present invention is that it is a resin impregnation method and then the resin is penetrated inside the single board so that the binding capacity and the dimensional stability are far superior as compared to the adhesive method of the single surface that is a general method for producing plywood. In addition, the density of plywood is increased by the heat-compressive treatment so that the click-shape having high level of difficulty like reinforced floorboard can be given.

Low viscous resin for the smooth impregnation is preferably used as a synthetic resin. The density of the synthetic resin is preferably 100 to 20,000 cp. Phenol resin, acryl resin, melamine resin, urethane resin, urea resin, melamine-urea copolycondensation resin, melamine-phenol copolycondensation resin, vinyl acetate resin and the like can be used as the synthetic resin.

In addition, heat, pressure, and temperature as the condition for the heat-compressive treatment can be freely controlled according to a species of trees and usage. The density level of plywood in the structure according to the present invention is made in 0.6 to 1.0 g/cm$^3$.

The construction velocity is greatly improved by forming a click-bonding structure 31 on the side of plywood 30.

A click-bonding system is non-adhesive (glueless) mechanical fastening system, and is the system that is simultaneously fastened in horizontal direction as well as in vertical direction by forming both in horizontal direction and vertical direction while complexly connecting a groove part and a projecting part in a type of curve.

More specifically, for example as disclosed in Korean Registration Patent No. 430315, a rigid floor panel that composes a floor cover is as follows: the shape of the panel is a quadrangle of long shape or square; the panel has a pair and two pairs of counter sides; a coupling part of a type of a projecting part and a groove part is at least provided at edges of two pairs of counter sides of the panel; an integral mechanical fastening mean is provided in which the coupling part includes each fastening element that is extended in longitudinal direction of relevant edge; In the state such that the fastening mean is composed of single board and a core of the panel thereby connecting two panels each other, the coupling part provide to fasten in perpendicular to the flat surface of the panel as well as in parallel direction to the flat surface of the panel and perpendicular to the connected edge with the fastening mean; the materials of core is composed of HDF board or MDF board; the coupling part and the fastening mean that are made from the above core provide a snap fastening connection that makes surly the fastening elements tighten at the backs of each other by shifting the floor panel in side direction toward each other evenly so that two floor panels can be implemented to be fasten.

A plurality of grooves 32 may be formed on the backside of the plywood 30 for improving a dimensional stability of plywood flooring and an adhesive property with a floor 60. For example, the groove having a width of 1 to 2 mm, a height of 1 to 4 mm and the distance between grooves of 10 to 0 mm may be formed.

An adhesive may glue the plywood flooring to a floor 60, and epoxy-based adhesive, and the like may be used.

Foam 50 prevents water from a floor 60, provides a smoothness of the floor, and has a role in preventing an impact noise between the plywood flooring product and the floor 60. For example, foaming polyurethane (PU) may be used as Foam 50. A method for laminating the plywood 30 and Foam 50 is the same with the method for constructing a general reinforced floorboard, and for example Foam 50 sheet is firstly spread over whole floor, and then a flooring material is constructed. In addition, Foam 50 may be adhered on the bottom of plywood 30 thereby providing an integral product of the plywood 30 and Foam 50.

Example 1

A heat-compressive treatment was omitted as a substrate, and the plywood that was impregnated with a synthetic resin having a viscosity of 1,000 cp was used. The side of the plywood was simple click-shaped as shown in FIG. 1, and a groove was formed on the backside of the plywood. A marked type wood was used as a surface layer, and a surface protective layer was formed as UV coating. The plywood and a floor were adhered with epoxy-based adhesive thereby producing plywood flooring having the structure as shown in FIG. 1.

Example 2

Plywood that was impregnated (using a synthetic resin having a viscosity of 1,000 cp) and was heat-compressive treated (density of 0.7 g/cm$^3$) was used as a substrate. The side of the plywood was click-shaped in high level of difficulty as shown FIG. 2. A marked type wood was used as a surface layer and a surface protective layer was formed with UV coating. Foaming PU was laminated on the bottom of the plywood thereby producing plywood flooring having the structure as shown in FIG. 2.

Example 3

Plywood that was impregnated with resin (using a synthetic resin having a viscosity of 1,000 cp) and was heat-compressive treated (density of 0.7 g/cm$^3$) was used as a substrate. The side of the plywood was click-shaped as shown FIG. 2. A printing film was used as a surface layer and a surface protective layer was formed with UV coating. Foaming PU was laminated on the bottom of the plywood thereby producing plywood flooring having the structure as shown in FIG. 2.

Comparative Example 1

As disclosed in Japanese Patent Publication No. 2002-194885, T&G bonding structure was formed on plywood thereby producing plywood flooring.

Comparative Example 2

As disclosed in Korean Patent Registration No. 674210, high-pressure melamine laminated board (HPM), and the like was laminated on the baseboard (substrate) of high-density fiberboard (HDF), and the like thereby producing reinforced floorboard having a click-structure.

Test Example

A dimensional stability and surface property were measured about flooring materials according to Examples and Comparative Examples, and then the results were shown in the following Table 1.

TABLE 1

| Section | Dimensional Stability (%) | | | | Surface Property | | |
|---|---|---|---|---|---|---|---|
| | Heating | | Immersion | | Dent Property | Break Property | Scratch |
| | L | W | L | W | | | |
| Example 1 | −0.13 | −0.27 | 0.12 | 0.22 | 10 cm | 20 cm | 2N |
| Example 2 | −0.07 | −0.13 | 0.09 | 0.17 | 40 cm | 60 cm | 5N |
| Example 3 | −0.06 | −0.11 | 0.07 | 0.14 | 40 cm | 70 cm | 6N |
| Com. Ex. 1 | −0.15 | −0.30 | 0.15 | 0.25 | 5 cm | 10 cm | 1N |
| Com. Ex. 2 | −0.30 | −0.38 | 0.35 | 0.40 | 20 cm | 40 cm | 4N |

The products according to Examples and Comparative Examples were injected into a drying oven at 80° for 24 hours for heating of a dimensional stability in Table 1, and were injected to water of room temperature for 24 hours according to standard for evaluation KS F 3200 as an immersion so that the dimensional change before and after injection was measured in length direction (L) and width direction (W) of the product, respectively.

A dent property and break property of surface properties in Table 1 were evaluated by measuring a falling height when occurring a dent and break on the surface of product when naturally falling an iron bead having weight of 246 g according to standard for evaluation KS F 3104. As scratch was evaluated by measuring a force that generates a scratch when scratching using the blade of a knife with a specific force on the surface of product.

As shown in Table 1, it could be known that in the case of Examples, the dimensional stability and surface property were generally excellent under the influence of plywood substrate that was impregnated with resin and heat-compressive treated, and specifically, were definitely excellent as compared to a general plywood flooring of Comparative Example 1.

In addition, it could be known that in the case of Example 1 and Example 3 that were click-shaped in high level of difficulty, the construction velocity was the same with that of existed reinforced floorboard (Comparative Example 2).

INDUSTRIAL APPLICABILITY

The plywood flooring may have all of a quick construction, a strong surface property, and an excellent dimensional stability that are the advantages of reinforced floorboard and plywood flooring.

In addition, the plywood having high density that is obtained from the heat-compressive treatment of plywood according to the present invention is click-shaped so that non-adhesive plywood flooring having a click-shape, and excellent dimensional stability and surface property like reinforced floorboard can be provided. When using an adhesive for construction, the heat-compressive treatment of plywood can be omitted and can be click-shaped so that adhesive plywood flooring that can improve the construction velocity can be provided.

Additionally, the problem according to an indoor air quality can be solved through constructing a flooring material in non-adhesive method without an adhesive for construction and using an environmental-friendly synthetic resin.

The invention claimed is:

1. A plywood flooring comprising:
   a plywood as a substrate, wherein the plywood is heat-compressive treated in a density of 0.6 to 1.0 g/cm$^3$ and is impregnated with a synthetic resin having a viscosity of 100 to 20,000 cp; and
   a click-bonding structure formed on a side of the plywood, wherein the plywood flooring further comprises a surface protective layer and a surface layer on the plywood.

2. The plywood flooring according to claim 1, wherein the plywood flooring is non-adhesive between the plywood and a floor.

3. The plywood flooring according to claim 1, wherein the plywood flooring is adhesive type, in which the plywood is adhered to a floor with an adhesive.

4. The plywood flooring according to claim 1, wherein the surface layer is composed of a marked type wood, a printing layer or a printing film.

5. The plywood flooring according to claim 1, wherein a groove is formed on the back of the plywood.

6. The plywood flooring according to claim 1, wherein foam is laminated on the bottom of the plywood.

7. The plywood flooring according to claim 1, wherein the synthetic resin is one or more selected from the group consisting of phenol resin, acryl resin, melamine resin, urethane resin, urea resin, melamine-urea copolycondensation resin, melamine-phenol copolycondensation resin, and vinyl acetate resin.

* * * * *